United States Patent [19]

Lamers

[11] Patent Number: 5,336,314
[45] Date of Patent: Aug. 9, 1994

[54] POLYMERS FOR PIGMENT FLUSHING

[75] Inventor: Paul H. Lamers, Allison Park, Pa.

[73] Assignee: PPG Industries, Inc., Pittsburgh, Pa.

[21] Appl. No.: 99,501

[22] Filed: Jul. 3, 1993

[51] Int. Cl.$^5$ .............................................. C08K 5/00
[52] U.S. Cl. ..................................... 106/506; 106/400;
106/401; 106/499; 526/317.1
[58] Field of Search ............... 106/506, 400, 401, 499;
526/317.1

[56] References Cited

U.S. PATENT DOCUMENTS

| | | | |
|---|---|---|---|
| 4,762,569 | 8/1988 | Miki et al. | 106/476 |
| 4,765,841 | 8/1988 | Vinther et al. | 106/402 |
| 4,957,842 | 9/1990 | Fukase et al. | 430/114 |
| 5,030,283 | 7/1991 | Bender et al. | 106/228 |

*Primary Examiner*—Karl Group
*Assistant Examiner*—Scott L. Hertzog
*Attorney, Agent, or Firm*—William J. Uhl

[57] ABSTRACT

Pigment dispersing vehicles which are polymers containing one or more groups of the structure:

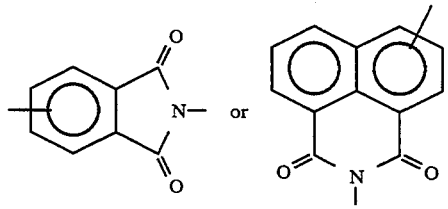

are disclosed. The pigment dispersing vehicles can be used to form pigment dispersions by the pigment flushing mechanism. The resultant dispersions have high pigment loadings and color strength enabling them to be used across many coating lines.

14 Claims, No Drawings

POLYMERS FOR PIGMENT FLUSHING

FIELD OF THE INVENTION

The present invention relates to pigment dispersions and more particularly to polymeric vehicles useful in obtaining such pigment dispersions by a pigment flushing mechanism.

BACKGROUND OF THE INVENTION

In the coatings area, pigmented coating compositions are commonly employed to obtain a final finish that possesses both protective and aesthetic qualities. Such coating compositions are formed from a mixture of durable film-forming resins plus finely dispersed pigments. To incorporate the pigment into the coating composition, the pigment is usually dispersed in a resinous dispersing vehicle, typically by a milling or grinding process. The resultant pigment dispersion is combined with the film forming resinous binder to form tile coating composition. To ensure proper color development and appearance, it is important that the pigment or pigments employed be well dispersed in the dispersing vehicle and throughout the coating composition. As such, the choice of dispersing vehicle and the process by which the pigments are dispersed in that vehicle is of critical importance.

As mentioned above, for coating compositions, the pigment dispersions are, for the most part, produced by a dry grinding process. This process typically involves several steps including first drying the aqueous pigment slurry in which the pigment is prepared. This is usually done by the pigment manufacturer to produce a dry agglomerated pigment, which is then ground or milled by the coatings supplier with the dispersing vehicle to break up the agglomerates and to disperse the pigment in the dispersing vehicle. Such a dispersion method requires a high expenditure of energy and can also be time consuming. In addition the resulting pigment dispersion has a relatively low pigment to dispersion vehicle ratio which can result in low tint strengths. The relatively high levels of dispersion vehicle can affect final coating properties and as a result many different pigment dispersions or tint lines must be prepared for various coating lines. For example, a pigment dispersion useful in a thermally cured coating would not necessarily be usable with an air dried coating or another type of thermally cured coating.

Another method useful for producing pigment dispersions, primarily for use in inks, is the "flushing method". This method involves treating a pigment presscake, i.e., a concentrated aqueous slurry of pigment obtained in the pigment manufacturing process, with a resinous pigment dispersing vehicle, commonly referred to as a flushing vehicle, under shearing conditions to displace water on the pigment surface by the resinous vehicle. With the flushing method, a stable pigment dispersion can be produced without the intermediate steps of drying the pigment slurry and milling the pigment to break up pigment agglomerates and disperse the pigment in the dispersion vehicle. Relative to dry grinding, or milling, flushing offers the potential for obtaining a pigment dispersion in less time and with less energy. However, the pigment flushing method has not been widely applied in the area of exterior durable coatings. Flushing vehicles that are commonly used in the ink industry, i.e., alkyd resins, do not weather well in finishes that must endure prolonged exterior exposure.

Therefore it would be desirable to have a durable pigment dispersion vehicle which could be used as a flushing vehicle in the pigment flushing process to provide pigment dispersions which could be used across numerous coating lines.

SUMMARY OF THE INVENTION

In accordance with the present invention, a pigment dispersion comprising finely divided pigment dispersed in a polymer containing one or more groups of the following structure is provided,

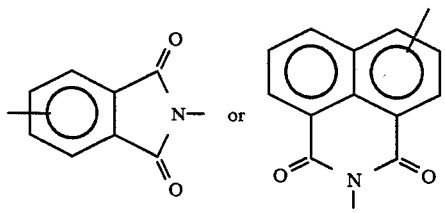

The pigment dispersions can be prepared by a flushing process which comprises mixing together an aqueous pigment presscake with the polymers as a dispersing or flushing vehicle under shearing conditions to displace water and intimately disperse the pigment in the polymer. The resulting pigment dispersions or flushes have relatively high pigment to dispersion vehicle weight ratios compared to dispersions prepared by the dry grinding process often resulting in dispersions with high tint strengths and enabling the dispersions to be used across many coating lines.

DETAILED DESCRIPTION

The polymer containing the phthalimide or naphthalimide groups can be either polyester or acrylic polymers or mixtures thereof, with polyester being preferred.

Typically the polyesters are produced by reacting a polyhydric alcohol component with a polybasic carboxylic acid component to form an acid or hydroxyl functional polyester which may then be reacted with the phthalimide or naphthalimide containing compound through a linking group. Alternately, the phthalimide or naphthalimide groups can be formed "in situ" by reacting the polyhydric alcohol and polybasic carboxylic acid in the presence of other components such as anhydrides and amines to obtain a polyester which contains pendent phthalimide or naphthalimide groups.

The polyhydric alcohols which are useful in forming the polyester have a functionality of at least two and typically contain from 2 to 16 carbon atoms, preferably from 2 to 8 carbon atoms. Such polyhydric alcohols include diols, triols and higher functionality polyols. Useful diols include alkylene glycols, e.g., ethylene glycol, propylene glycol, butylene glycol, diethylene glycol, dipropylene glycol, triethylene glycol, neopentyl glycol, 2,2,4-trimethyl-1,3-pentanediol and cyclohexanedimethanol. Triols and higher functionality polyols include trimethylolethane, trimethylolpropane, glycerol, 1,2,6-hexanetriol and pentaerythritol. Mixtures of polyhydric alcohols can also be used.

The polybasic carboxylic acids which are useful in forming the polyester have a functionality of at least two and typically contain from 2 to 36 carbon atoms. The polybasic carboxylic acid can be aliphatic or aromatic.

Examples of polybasic carboxylic acids are phthalic acid, isophthalic acid, terephthalic acid, succinic acid, glutaric acid, adipic acid, azelaic acid, sebacic acid, dimerized fatty acids and mixtures thereof. The aliphatic carboxylic acids can contain from 2 to 36 carbon atoms while aromatic carboxylic acids contain from 8 to 16 carbon atoms, (inclusive of the number of carbon atoms in the carboxyl group). Dicarboxylic acids are the preferred polybasic carboxylic acids, although minor amounts of higher functionality carboxylic acids, for example, trimellitic acid, can be included in admixture with the dicarboxylic acid.

In addition to the polybasic acids described above, anhydrides are particularly useful in the practice of the invention in that they can be reacted with the polyhydric alcohols and polybasic carboxylic acids and materials having amine functionality to form pendent phthalimide or naphthalimide groups in situ. Alternately the phthalimide or naphthalimide can be separately prepared and reacted through a linking group with a preformed polyester containing hydroxy or carboxylic acid functionality. Examples of useful anhydrides include phthalic anhydride, hexahydrophthalic arthydride, succinic anhydride, trimellitic anhydride, 1,8-naphthalic anhydride, a $C_{16}$–$C_{18}$-alkenylsuccinic anhydride and pyromellitic anhydride.

The polyester can be produced using conventional batch or continuous processing techniques with the reaction conditions and ratio of reactants being chosen so as to provide a product having the desired functionality. The acid functional polyesters typically have an acid number from about 1 to about 70 and preferably from about 4 to about 40 (on a solids basis). Hydroxyl functional polyesters typically have hydroxyl values of at least 10, and preferably within the range of 50 to 150 (on a solids basis).

The polyesters typically have a weight average molecular weight (Mw) of about 500 to about 50,000, preferably from about 2,000 to 35,000, and more preferably from about 3,000 to about 15,000. The molecular weight is determined by gel permeation chromatography using a polystyrene standard.

Besides polyesters, acrylic polymers having phthalimide or naphthalimide groups are also useful in the practice of the invention. Typically the acrylic polymer is prepared such that it has hydroxyl, carboxylic acid, epoxy or isocyanate functionality. The acrylic polymer is then reacted through a linking group with a compound containing phthalimide or naphthalimide groups to introduce pendent phthalimide or naphthalimide groups into the polymer.

The acrylic polymers are preferably copolymers of one or more alkyl esters of acrylic acid or methacrylic acid with an ethylenically unsaturated monomer containing hydroxyl or carboxylic acid functionality and optionally one or more other polymerizable ethylenically unsaturated monomers.

Suitable alkyl esters of acrylic acid or methacrylic acid are those which typically contain from 1 to 20 carbon atoms in the alkyl group and include, for example, methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, cyclohexyl methacrylate, isodecyl methacrylate, isobornyl methacrylate, methyl acrylate, ethyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, isobornyl acrylate and the like.

Suitable ethylenically unsaturated monomers containing hydroxyl, epoxy, carboxylic acid or isocyanate functionality include, for example, acrylic acid, methacrylic acid, hydroxyethyl acrylate, hydroxyethyl methacrylate, glycidyl acrylate, glycidyl methacrylate, hydroxypropyl acrylate, hydroxypropyl methacrylate and isopropenyl-α-α-dimethylbenzylisocyanate (m-TMI).

Examples of other polymerizable ethylenically unsaturated monomers are monomers containing a vinyl group other than the vinyl monomers mentioned above. Specific examples include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polymer may be prepared by conventional solution polymerization techniques of the aforedescribed individual monomers in the presence of suitable vinyl polymerization catalyst and an inert organic solvent. The reaction can be conducted at a temperature of from about 80° C. to about 160° C., preferably from about 110° C. to about 145° C. The time to conduct the reaction can be from about 45 minutes to about 6 hours, preferably from about 90 minutes to about 2.5 hours. Examples of suitable inert organic solvents include the following: ether-type alcohols, e.g., ethylene glycol monobutyl ether, ethylene glycol monoethylether, propylene glycol monobutylether, ethanol, propanol, isopropanol, butanol, isobutanol, toluene, methyl ethyl ketone, methyl amyl ketone, V.M.&P Naphtha and the like. Alternately, tile acrylic polymer may be prepared by aqueous emulsion or dispersion polymerization techniques.

The polymerization is carried out in the presence of suitable vinyl polymerization catalysts such as organic peroxides or azo compounds. Preferred catalysts include, e.g., azobis( isobutyronitrile ), 2,2'-azobis(2-methylbutyronitrile), 2,2'-azobis(2-methylpropionitrile), tertiary butyl perbenzoate, tertiary butyl pivalate, tertiary butyl acetate, isopropyl percarbonate or benzoyl peroxide. Optionally, chain transfer agents such as alkyl mercaptans, e.g., tertiary dodecyl mercaptan and the like, can also be used.

The acrylic polymers will typically have a weight average molecular weight (Mw) from about 1,500 to about 100,000, preferably from about 2,500 to 50,000, and more preferably from about 3,000 to about 30,000; with the molecular weight being determined by gel permeation chromatography using a polystyrene standard.

As mentioned above, the polymer will also have phthalimide or naphthalimide groups preferably as represented by the following structural formulas:

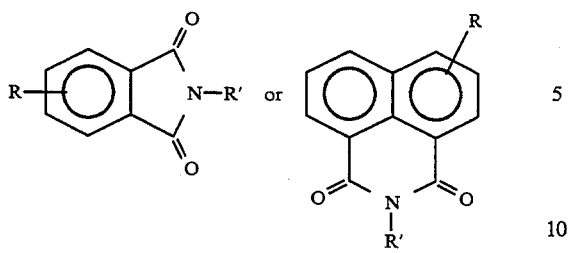

where R is H or P-X, X being an organic, preferably divalent organic linking radical and P being a polymer segment, for example, the polyester or acrylic polymers mentioned above, and R' is H or a group containing an alkylene chain of from 1 to 20, preferably 2 to 7 carbon atoms, or P-X as defined earlier. Preferably, the phthalimide or naphthalimide groups are pendent groups where only one of R and R' is P-X. In a preferred embodiment, R' is an amido substituted alkyl group containing 1 to 18, more preferably 2 to 7 carbon atoms in the alkyl group.

As mentioned above the phthalimide or naphthalimide groups can be incorporated into the polyester or acrylic during the initial synthesis or by a modification of a previously synthesized polyester or acrylic. Typically the phthalimide or naphthalimide groups are formed through the reaction between an amine functional material and an anhydride.

Examples of anhydrides are those mentioned above.

The amine functional materials can be either mono or polyfunctional. Additionally the amine functional materials can also have acid, hydroxyl or additional functionality if desired. Examples of amine functional materials that are useful herein include 4-aminobenzoic acid, ARMEEN CD which is fatty aliphatic amine of $C_8-C_{14}$ carbon atoms available commercially from Armak Chemicals, p-aminophenol, ethanolamine, diethylenetriamine, 1,6-hexanediamine, melamine, aminocaproic acid, alanine and AEPD (2-amino, 2-ethyl, 1,3-propanediol) from Angus Chemical Co.

The amine functional material or the arthydride may contain an organic linking group or radical which attaches the phthalimide or naphthalimide groups to the polymer chain. The organic linking radicals are preferably divalent and are derived from compound which also contain a functional group such as hydroxyl, carboxylic acid, anhydride, epoxy, isocyanate or the like to react with the hydroxyl, carboxylic acid, isocyanate or epoxy groups of the polymer segment. Examples of suitable linking groups include: —$(CH_2)_n$—O—, where n is an integer from 2 to 6; —$(CH_2)_n$—NH—, where n is an integer from 2 to 6;

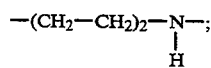

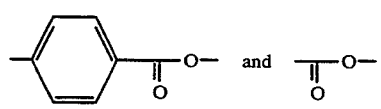

The following is a list of structural formulas which represent phthalimide and naphthalimide groups along with linking groups.

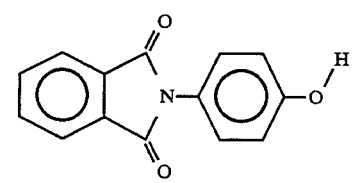

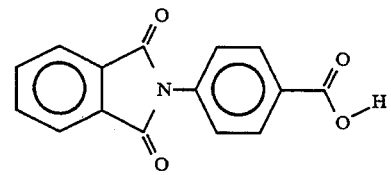

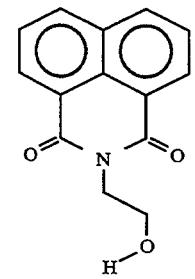

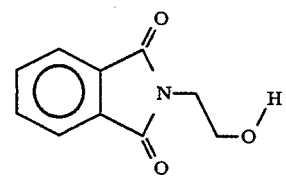

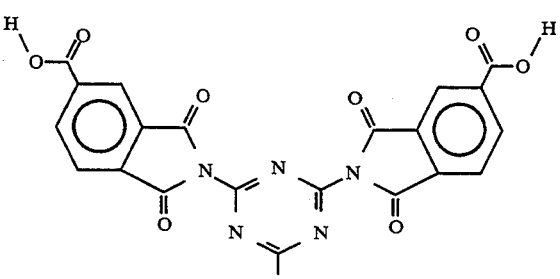

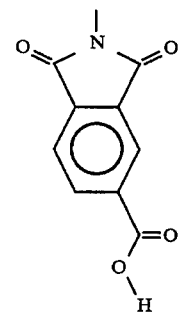

-continued

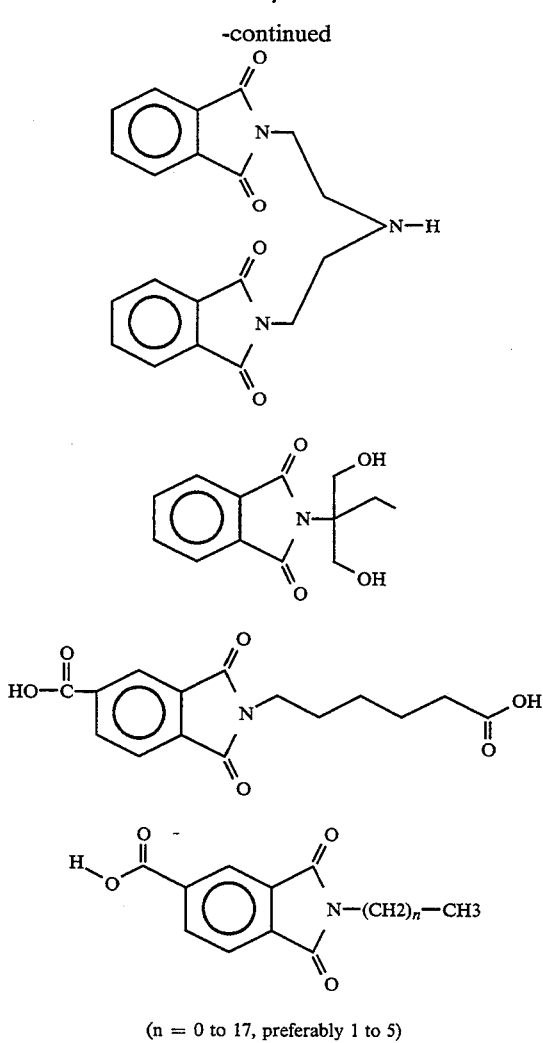

(n = 0 to 17, preferably 1 to 5)

The amount of phthalimide or naphthalimide groups, i.e.,

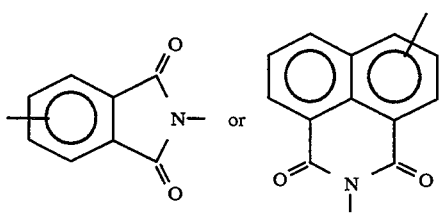

groups, present in the polymer is within the range of about 0.1 percent to about 60 percent, preferably from about 1 percent to about 60 percent, and most preferably from about 2 percent to about 50 percent by weight based on total weight of the polymer.

The polymers as described above are useful as pigment dispersion vehicles, and are particularly useful in the flushing process in which a concentrated aqueous slurry of pigment, commonly called a presscake, is mixed with the pigment dispersion vehicle under shear conditions to displace the water and disperse the pigment throughout the dispersion vehicle. The polymer can also be used as a pigment dispersion vehicle in a dry grinding or milling process in which pigment is milled with the polymer to disperse the pigment throughout the polymer.

Suitable pigments useful in the pigment dispersions of the present invention include organic pigments conventionally used in the coatings industry such as perylenes, phthalo green, phthalo blue, nitroso pigments, monoazo pigments, disazo pigments, disazo condensation pigments, basic dye pigments, alkali blue pigments, blue lake pigments, phloxins pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and carbon black pigment. Also, inorganic pigments such as titanium dioxide and iron oxides particularly in combination with organic pigments can be used.

In the flushing process dispersing aids, so called hyperdispersants, such as those available from Zeneca Inc. under the trade mark SOLSPERSE, are typically added to a "flusher" which is a shear mixing apparatus, typically a double trough kneader, or sigma mixer, fitted with a steam jacket and a vacuum device. Heat is applied, if necessary, to melt the dispersing aid followed by adding a portion of the presscake or pigment slurry which typically has a pigment solids content of about 10 percent to about 60 percent by weight. The polymer containing the phthalimide or naphthalimide groups, (the pigment dispersion vehicle or flushing vehicle), is then added and mixing continues until water is displaced from the pigment presscake and the pigment is wetted by the flushing vehicle. The displaced water is subsequently removed from the flusher and the above steps are repeated until the desired pigment to dispersion vehicle ratio is achieved. The flush is usually heated under vacuum to remove residual water. Optionally small amounts of solvents or additional resins may be added to adjust the viscosity of the pigment dispersion to the desired level. The pigment dispersions can also contain other additives commonly used in pigment dispersion compositions, for example, plasticizers, defoamers, diluents and flow control agents.

The final pigment dispersion typically has a pigment to dispersion vehicle ratio of about 0.2:1.0 to about 3:1.0 and preferably from about 0.8:1.0 to about 1.6:1.0.

The total solids of the final pigment dispersion typically range from about 10 percent to about 90 percent and preferably from about 40 percent to about 80 percent by weight based on total weight of the pigment dispersion.

The dispersion vehicle, is present in the pigment dispersion in amounts ranging from about 10 percent to about 60 percent and preferably from about 20 percent to about 45 percent by weight based on total weight of the pigment dispersion.

The pigment dispersion compositions as described above can be formulated to have high pigment to dispersion vehicle weight ratios. As such the dispersions contain relatively little dispersion vehicle. This enables these flushes to be used across a wide variety of product lines. The dispersions can be used for air dried and thermally cured coatings. Since the dispersions contain relatively little dispersion vehicle, final coating properties, i.e., cure and intercoat adhesion, will not be subsequently affected by the dispersion vehicle. In fact, because of the high pigment to dispersion vehicle ratios of the pigment dispersions of the present invention, coating compositions, into which the pigment dispersions are incorporated, can be modified with additional resins to optimize coating properties.

The present invention is more particularly described in the following examples, which are illustrative only, since modification and variations will be apparent to those skilled in the art. All quantities, percentages and ratios are on a weight basis unless otherwise indicated. The following testing procedures were used in the examples which follow.

TESTING PROCEDURES

Minimum sag of the coatings was determined by applying the coating to a 4 inch by 12 inch pretreated steel panel in such a way as to produce increasing film thickness from the top of the panel to its base. Prior to curing the coated panels, lines are drawn horizontally through tile wet coating. The coated panels were then cured in an electric oven, while hanging in a vertical position. Upon removing the coated panels from the oven, the cured film thickness at which the coating above the scribe line sags below the scribe line is designated as the "Minimum Sag". The lower the minimum sag number, the greater the flow of the coating.

Sward hardness was determined in accordance with ASTM-D2143. The value given for Sward Hardness is indicative of the number of cycles, or rockings, of the Sward Hardness wheel prior to the formation of indentations in the coating; the higher the value, the harder the coating.

Gasoline and toluene resistance were determined by placing two drops of the solvent on a coated panel and allowing the drops to evaporate. Values ranged from 1 to 5, with 5 indicating excellent gasoline or toluene resistance. The values are further suffixed with letters, (A), (B) or (C), with (A) indicating no gloss loss, (B) indicating some dulling, and (C) indicating substantial loss of gloss.

Chip resistance was determined with a Gravelometer, Model QGR from the Q Panel Company. The chip resistance test is conducted generally in accordance with the procedure of ASTM D-3170-74 in which a chilled coated steel panel is impacted with gravel, fired at a 90 degree angle to the panel using a high pressure stream of air. The appearance of the chipped panel was then compared to photographic standards and rated on a scale from 0 to 10, with a value of 10 indicating no chipping and 0 indicating massive chipping.

Hot Room Paint Color Drift was determined by measuring the change in color intensity of a coated panel before and after exposure of the coating composition to a 120° F. (49° C.) hot room for one week. The change in color intensity or color shift is reported in Delta E values. The larger the value of Delta E, the greater the color shift. Delta E value of 0 indicates no color shift and good coating composition stability. Delta E values were obtained by measuring the color intensity of reflected light in the visible region (380 to 780 nanometers) using a MacBeth 2020 Color Eye available from MacBeth Corp. in accordance with the procedures of ASTM E-308-90.

Shear Stability was determined by measuring the change in color intensity of a coated panel before and after subjecting the coating composition to shearing forces in a Waring Blender for 30 seconds. The change in color intensity is reported in Delta E values as mentioned above. The lower the value of Delta E, the better the shear stability of the coating composition.

Hot Room Tint Color Drift was determined by measuring the change in color intensity of a coated panel before and after exposure to a 120° F. (49° C.) hot room for one week of a tint or pigment dispersion which is used in formulating the coating composition used to coat the panel being measured. The change in color intensity is reported in Delta E values as mentioned above. The lower the value of Delta E, the better the stability of the tint.

Tint Strength was determined by measuring the color intensity of coated panels as described above. One set of the coated panels was prepared with a coating composition containing a flushed pigment dispersion of the present invention (experimental panels) and a second set of coated panels was prepared with a similar coating composition but containing a pigment dispersion prepared by milling the dry pigment into a pigment dispersing vehicle (control panels). The change in color intensity of the experimental panels compared to the control panels is reported in Delta E values. The tint strength of the coating composition containing the milled pigment dispersion is given a value of 100%. The tint strength of the coating composition using the flushed pigment dispersion is reported as a percentage value in relation to the control.

Values over 100% indicate that the flushed pigment dispersion will provide greater color intensities than the milled pigment dispersion; the greater the value, the greater the color intensity.

Waring Blender Tint Strengths are determined by measuring the change in color intensity of coated panels as described above. One set of coated panels was prepared with a paint containing a flushed pigment dispersion of the present invention and a second set of coated panels was prepared with the same paint which was sheared in a Waring Blender for 30 seconds. The change in color intensity of the coated panels prepared with the sheared paint compared to the coated panels prepared with the unsheared paint (Delta E value) are determined and the color intensity for the panel coated with the unsheared paint is given a value of 100%. The color intensity of the panel coated with the sheared paint is reported as a percentage value in relation to the panel coated with time unsheared paint. Values as close to 100% are desired which indicate that shearing has little effect on the color intensity of the coating.

Adhesion was determined according to ASTM D-3359-87 (crosshatch adhesion). Values range from 0 to 5 with 5 indicating no loss of adhesion.

20° Gloss measured with a Pacific Scientific 20 degree gloss meter (ASTM D-523). The higher the value, the higher the gloss.

DOI (Distinctness of Image) was measured on a C-Box manufactured by C-Box I$^2$R Company. The higher the value, the higher the DOI.

Pencil Hardness was determined by taking sharpened pencils of increasing hardness (from 6B to 5H) and attempting to etch a scribe mark in the coating. The next softest pencil which will etch the coating is reported as the pencil hardness for the coating (ASTM D-3363).

Humidity testing is done by placing coated panels in a humidity chamber maintained at 100° F. (38° C.) and 100 percent relative humidity for 96 hours. The panels were removed and evaluated for change in gloss and adhesion before and after testing.

V.O.C. (volatile organic content) was given in units of pounds of volatile organic material per gallon of coating composition with the volume of water (if any) present in the formulation being subtracted from the composition.

EXAMPLES

The following examples, (Examples A–H), show the preparation of various dispersion vehicles that are useful in the practice of the invention.

EXAMPLE A

This example describes the preparation of a preferred embodiment of a phthalimide containing polyester dispersion vehicle. The phthalimide containing polyester was prepared from the following mixture of ingredients:

| Ingredients | Parts by Weight (grams) |
|---|---|
| 2-Methyl-1,3-Propanediol (2-MPD) | 1671. |
| 4-Aminobenzoic Acid | 43. |
| Phthalic Anhydride | 46.4 |
| Adipic Acid | 982. |
| Isophthalic Acid | 1368. |
| TOTAL | 4110.4 |

A suitable reaction vessel equipped with an appropriate agitator, a nitrogen blanket and a simple distillation setup was initially charged in order, at room temperature, with the above listed ingredients. The reaction mixture was then heated to 200° C. and water was removed by distillation. The distillation of water was continued, with the temperature of the reaction vessel held at 200° C., until an acid value between 4 to 6 (milligrams KOH/gram sample) was obtained. The reaction mixture was then cooled and transferred into a suitable container. The dispersion vehicle was found to have the following physical values: 99.0 percent weight solids based on the total weight; a Zahn viscosity greater than Z10; an acid value of 6.0 (milligrams KOH/gram sample); a hydroxyl value of 80 (milligrams KOH/gram sample); a number average molecular weight, Mn, of 1678 and a weight average molecular weight of 3395.

EXAMPLE B

This example describes the preparation of a phthalimide containing polyester dispersion vehicle. The phthalimide containing polyester was prepared from the following mixture of ingredients:

| Ingredients | Parts by Weight (grams) |
|---|---|
| 2-Methyl-1,3-Propanediol | 1587. |
| ARMEEN CD[1] | 60. |
| Trimellitic Anhydride | 57. |
| Adipic Acid | 933. |
| Isophthalic Acid | 1297. |
| TOTAL | 3934. |

[1]ARMEEN CD is a fatty aliphatic amine commercially available from Armak Chemicals containing from $C_8$ to $C_{14}$ carbon atoms in the aliphatic group.

A suitable reaction vessel equipped with an appropriate agitator, a nitrogen blanket and a simple distillation setup was initially charged in order, at room temperature, with the above listed ingredients. The reaction mixture was then heated to 200° C. and water was removed by distillation. The distillation of water was continued, with the temperature of the reaction vessel held at 200° C., until an acid value between 4 to 6 (milligrams KOH/gram sample) was obtained. The reaction mixture was then cooled and transferred into a suitable container. The dispersion vehicle was found to have the following physical values: 98.4 percent weight solids based on the total weight; a Zahn viscosity greater than Z10; an acid value of 5.5 (milligrams KOH/gram sample); a hydroxyl value of 96 (milligrams KOH/gram sample); a number average molecular weight, Mn, of 1561 and a weight average molecular weight of 2792.

EXAMPLE C

This example describes the preparation of a phthalimide containing polyester dispersion vehicle. The phthalimide containing polyester was prepared from the following mixture of ingredients:

| Ingredients | Parts by Weight (grams) |
|---|---|
| CHARGE-1 | |
| 2-Methyl-1,3-Propanediol | 1032. |
| ARMEEN CD | 39. |
| Trimellitic Anhydride | 37. |
| Adipic Acid | 607. |
| Isophthalic Acid | 842. |
| CHARGE-2 | |
| Trimellitic Anhydride | 263. |
| TOTAL | 2820. |

A suitable reaction vessel equipped with an appropriate agitator, a nitrogen blanket and a simple distillation setup was initially charged in order, at room temperature, with the above ingredients as listed in Charge-1. The reaction mixture was then heated to 200° C. and water was removed by distillation. The distillation of water was continued, with the temperature of the reaction vessel held at 200° C., until an acid value less than or equal to 6 (milligrams KOH/gram sample) was obtained. The reaction mixture was then cooled to 50° C. and Charge-2 was added. The contents of the reaction vessel were then heated to 200° C. and water was again removed by distillation until an acid value in the range of 30 to 35 (milligrams KOH/gram sample) was obtained. The reaction mixture was then cooled and transferred into a suitable container. The dispersion vehicle was found to have the following physical values: 99.8 percent weight solids based on the total weight; a Zahn viscosity greater than Z10; an acid value of 33.4 (milligrams KOH/gram sample); a hydroxyl value of 36 (milligrams KOH/gram sample); a number average molecular weight, Mn, of 3058 and a weight average molecular weight of 14852.

EXAMPLE D

This example describes the preparation of a phthalimide containing polyester dispersion vehicle which is modified with an oligomeric anchor group. The phthalimide containing polyester was prepared from the following mixture of ingredients:

| Ingredients | Parts by Weight (grams) |
|---|---|
| CHARGE-1 | |
| 2-Methyl-1,3-Propanediol | 1582. |
| 1,6-Hexanediamine | 34. |
| CHARGE-2 | |
| Trimellitic Anhydride | 57. |
| $C_{16}$–$C_{18}$-Alkenylsuccinic Anhydride[1] | 99. |
| CHARGE-3 | |
| Adipic Acid | 930. |
| Isophthalic Acid | 1295. |

| Ingredients | Parts by Weight (grams) |
|---|---|
| TOTAL | 3997. |

[1] $C_{16}$-$C_{18}$-Alkenylsuccinic Anhydride is commercially available from Ethyl Corporation as $C_{16}$, $C_{18}$ ASA.

A suitable reaction vessel equipped with an appropriate agitator, a nitrogen blanket and a simple distillation setup was initially charged in order, at room temperature, with the above ingredients as listed in Charge-1. The reaction mixture was then heated to and held at 40° C. Under agitation, Charge-2 was added to the reaction mixture, the temperature was raised to 70° C. and the contents of the vessel were stirred for 30 minutes. Next, Charge-3 was added and the temperature of the reaction mixture was raised to 200° C. and water was removed by distillation until an acid value in the range of 4 to 6 (milligrams KOH/gram sample) was obtained. The reaction mixture was then cooled and transferred into a suitable container. The dispersion vehicle was found to have the following physical values: 98.6 percent weight solids based on the total weight; a Zahn viscosity greater than ZS; an acid value of 5.9 (milligrams KOH/gram sample); a hydroxyl value of 98 (milligrams KOH/gram sample); a number average molecular weight, Mn, of 1646 and a weight average molecular weight of 3150.

EXAMPLE E

This example describes the preparation of a naphthalimide containing polyester dispersion vehicle. The naphthalimide functional polyester was prepared from the following mixture of ingredients:

| Ingredients | Parts by Weight (grams) |
|---|---|
| CHARGE-1 | |
| 2,2,4-Trimethyl-1,3-Pentanediol | 872. |
| 4-Aminobenzoic Acid | 13.7 |
| 1,8-naphthalic Anhydride | 19.9 |
| CHARGE-2 | |
| Adipic Acid | 263. |
| Isophthalic Acid | 367. |
| TOTAL | 1535.6 |

A suitable reaction vessel equipped with an appropriate agitator, a nitrogen blanket and a simple distillation setup was initially charged in order, at room temperature, with the above ingredients as listed in Charge-1. The reaction mixture was then heated to and held at 80° C. with stirring for 30 minutes. Under agitation, Charge-2 was added to the reaction mixture, the temperature was raised to 210° C. and water was removed by distillation until an acid value in the range of 4 to 6 (milligrams KOH/gram sample) was obtained. The reaction mixture was then cooled and transferred into a suitable container. The dispersion vehicle was found to have the following physical values: 95.0 percent weight solids based on the total weight; a Zahn viscosity greater than Z10; an acid value of 5.8 (milligrams KOH/gram sample); a hydroxyl value of 110 (milligrams KOH/gram sample); a number average molecular weight, Mn, of 989 and a weight average molecular weight of 1809.

EXAMPLE F

This example describes the separate preparation of a phthalimide material containing an organic linking group, which is used in the preparation of a phthalimide containing acrylic polymer as described in Example H. The organic linking group containing phthalimide material was prepared from the following mixture of ingredients:

| Ingredients | Parts by Weight (grams) |
|---|---|
| ARMEEN CD | 204. |
| Trimellitic anhydride | 192. |
| N-methylpyrrolidone | 112. |
| TOTAL | 508. |

A suitable reaction vessel equipped with an appropriate agitator, a nitrogen blanket and a Dean-Stark trap was initially charged in order, at room temperature, with the above ingredients. The mixture was stirred without heating for 2 hours, after which it was heated to 180° C. Over a period of 4 hours, 20 ml of water was removed in the Dean-Stark trap. The contents of the reaction vessel were cooled to 50° C. and poured into 1800 parts of ice water to precipitate the product. After filtering, the solid precipitate was dried in a vacuum oven to yield a tan colored solid with a melting point of 118° to 125° C.

EXAMPLE G

This example describes a glycidyl containing acrylic polymer which is later reacted with the organic linking group containing phthalimide material, as described in Example F, to form a phthalimide containing acrylic polymer, as described in Example H. The glycidyl functional acrylic polymer was prepared by polymerizing under free radical initiated organic solution polymerization techniques the following monomers: glycidyl methacrylate (35 percent), methyl methacrylate (2 percent), butyl methacrylate (61 percent), styrene (2 percent); the percentages are by weight being based on total weight of monomers. The resulting acrylic polymer had an epoxy equivalent weight of 598, a solids content of 75 percent by weight, and a weight average molecular weight of 7600.

EXAMPLE H

This example describes the preparation of a phthalimide containing acrylic polymer using the organic linking group containing phthalimide material as described in Example F and the glycidyl containing acrylic polymer as described in Example G. The phthalimide containing acrylic polymer was prepared from the following mixture of ingredients:

| Ingredients | Parts by Weight (grams) |
|---|---|
| Phthalimide material of Example F | 93. |
| Acrylic polymer of Example G | 126. |
| TOTALS | 219. |

A suitable reaction vessel equipped with an appropriate agitator and a nitrogen blanket was initially charged in order, at room temperature, with the above ingredients. The contents of the reaction vessel were then heated, under agitation, to 100° C. The reaction mixture was held at this temperature until an acid value of less than 4 (milligrams KOH/gram sample) was obtained. The reaction mixture was then cooled and transferred into a suitable container. The dispersion vehicle was found to have the following physical values: 73.5 percent weight solids based on the total weight; a Zahn viscosity of Z5+; an acid value of 2.1 (milligrams KOH/gram sample); a number average molecular weight of 2850 and a weight average molecular weight of 13,310.

PIGMENT DISPERSION EXAMPLES

Examples 1 through 3 describe the preparation by flushing of various pigment dispersions or flushes using the dispersion vehicles as described in Examples A and H.

EXAMPLE 1

This example describes the preparation of a phthalo green pigment dispersion using the dispersion vehicle as described in Example A. The dispersion was made by a flushing process from the following mixture of ingredients:

| Ingredients | Parts by Weight (grams) |
| --- | --- |
| SOLSPERSE 24000[1] | 70. |
| SOLSPERSE 5000[2] | 8. |
| SUNFAST GREEN PRESSCAKE[3] | 881. |
| Dispersion Vehicle of Example A | 212. |
| EKTASOLVE EEP[4] | 396. |
| TOTAL | 1567. |

[1]SOLSPERSE 24000 is a dispersant aid commercially available from Zeneca Inc.
[2]SOLSPERSE 5000 is a dispersant aid commercially available from Zeneca Inc.
[3]SUNFAST GREEN PRESSCAKE is a pigment presscake of Color Index Pigment Green #7 which is 39.4 percent solids by weight in pigment and is commercially available from Sun Chemical.
[4]Ethyl-3-ethoxy propionate from Eastman Chemical.

The pigment dispersion was made using a steam jacketed "Sigma Mixer" fitted with a vacuum apparatus. At room temperature, the SOLSPERSE 24000 and SOLSPERSE 5000 were added to the operating flusher. While mixing, tile contents of the flusher were heated to 50° C. by passing steam through the outer jacket. After the dispersion aids were melted, 434 grams of tile SUNFAST GREEN PRESSCAKE were added to the flusher followed by adding 117 grams of the dispersing vehicle of Example A to the flusher. Mixing was continued until a clear water phase separated (water break). The water phase (153 grams) was decanted from the flusher. At this point an additional 447 grams of the SUNFAST GREEN PRESSCAKE were added to the flusher, followed by an additional 95 grams of the dispersing vehicle of Example A. Flushing was continued until the water break resulting from this addition produced 240 grams of water which was removed by decantation followed by removal of an additional 103.5 grams of water. The pigment flush was then thinned by adding tile EKTASOLVE EEP. The resulting pigment dispersion had a weight solids of 60.5 percent, a room temperature viscosity of 3400 centipoises (as determined using a Brookfield RVT viscometer, #4 spindle, 20 revolutions per minute). The dispersion contained 33 percent pigment by weight and had a pigment to dispersion vehicle weight ratio of 1.2:1.

EXAMPLE 2

This example describes the preparation of a perrindo maroon pigment dispersion using the dispersion vehicle as described in Example A. The dispersion was made by a flushing process from the following mixture of ingredients:

| Ingredients | Parts by Weight (grams) |
| --- | --- |
| SOLSPERSE 24000 | 80. |
| PERRINDO MAROON PRESSCAKE[1] | 716. |
| Dispersion Vehicle of Example A | 148. |
| EKTASOLVE EEP | 294. |
| TOTALS | 1238. |

[1]PERRINDO MAROON PRESSCAKE is available commercially from Miles Inc.

The pigment dispersion was made using the steam jacketed pigment flusher of Example 1. At room temperature, the SOLSPERSE 24000 was added to the operating flusher. While mixing, the contents of the flusher were heated to 50° C. by passing steam through the outer jacket. After the dispersion aid was melted, 370 grams of PERRINDO MAROON PRESSCAKE were added to the flusher followed by the addition of 95 grams of the dispersion vehicle from Example A. Mixing was continued until a water break produced 135 grams of water which was decanted from the flusher. At this point an additional 346 grams of PERRINDO MAROON PRESSCAKE were added to the flusher, followed by an additional 43 grams of the dispersing vehicle of Example A. Flushing was continued until the water break resulting from this addition produced 160 grams of water which were removed by decantation. The contents of the flusher were then washed twice with deionized water and an additional 113.1 grams of water were removed by vacuum distillation. The pigment flush was then thinned by adding the EKTASOLVE EEP. The resulting pigment dispersion had a weight solids of 64.4 percent, a room temperature viscosity of 950 centipoises (determined as in Example 1). The dispersion contained 37 percent pigment by weight and had a pigment to dispersion vehicle weight ratio of 1.35:1.

EXAMPLE 3

This example describes the preparation of a phthalo green pigment dispersion using the dispersion vehicle as described in Example H. The dispersion was made by a flushing process from the following mixture of ingredients:

| Ingredients | Parts by Weight (grams) |
| --- | --- |
| SOLSPERSE 24000 | 70 |
| SOLSPERSE 5000 | 8 |
| SUNFAST GREEN PRESSCAKE | 810 |
| Dispersion Vehicle of Example H | 158 |
| EKTASOLVE EEP | 328 |

The pigment dispersion was made using the steam jacketed pigment flusher of Example 1. At room temperature, the SOLSPERSE 24000 and SOLSPERSE 5000 were added to the operating flusher. While mixing, the contents of the flusher were heated to 50° C. by passing steam through the outer jacket. After the dispersion aids were melted, 453 grams of the SUNFAST GREEN PRESSCAKE were added to the flusher followed by the addition of the dispersion vehicle of Example H. Mixing was continued until a water break produced 180 grams of water which were decanted off. At this point, an additional 357 grams of the SUNFAST GREEN PRESSCAKE were added followed by the addition of 65 grams of the pigment dispersion vehicle of Example H. Flushing was continued until the water break resulting from this addition produced 175 grams of water which was removed by decantation. The contents of the flusher were then washed twice with deionized water and the remaining water removed by vacuum distillation. The pigment flush was then thinned by adding the EKTASOLVE EEP. The resulting pigment dispersion had a weight solids of 63.6 percent and contained 39 percent by weight pigment. The dispersion had a pigment to dispersion weight ratio of 1.61:1.

COATING FORMULATION EXAMPLES

The following examples (Examples I-IV) show the preparation of various coating compositions using the pigment dispersion as described in Example 1.

EXAMPLE I

This example describes the preparation of a high solids coil coating composition made from the following mixture of ingredients:

| Ingredients | Parts by Weight (grams) |
| --- | --- |
| Pigment Dispersion of Example 1 | 3.8 |
| Polyester[1] | 150. |

[1]Film-forming polyester resin used in the preparation of the high solids coil coating composition available from PPG Industries, Inc. as TRUFORM III.

The coating composition of Example I was compared to the TRUFORM III formulation (Control) in which the pigment was incorporated into the formulation through a dry milling process. The coating composition of Example I was back formulated with additional polyester resin such that it had the same pigment to binder weight ratio (0.75:1) as the Control, The results of the comparison are reported in Table I below:

TABLE I

| Example | Tint Strength | Hot Room Paint Color Drift (Delta E) | Hot Room Tint Color Drift (Delta E) | Shear Stability (Delta E) |
| --- | --- | --- | --- | --- |
| Control | 100% | 0.26 | 0.26 | 1.0 |
| Example I | 136% | 0.19 | 0.11 | 0.93 |

EXAMPLE II

This example describes the preparation of an automotive original equipment manufacture (OEM) coating composition made from the following mixture of ingredients:

| Ingredients | Parts by Weight (grams) |
| --- | --- |
| Pigment Dispersion of Example 1 reduced to 28 percent solids with EKTASOLVE EEP | 107. |
| Polyester/Melamine[1] | 536. |

[1]Film-forming resinous binder used in the preparation of automotive OEM coating composition available from PPG Industries, Inc. as NHU-47126.

The coating composition of Example II was compared to the NHU-47126 formulation (Control) in which the pigment was incorporated into the formulation through a milling process. The coating composition of Example II was back formulated with a polyester made from 77 percent by weight of TONE 0301 (available from Union Carbide Corp.) and 23 percent by weight azelaic acid to optimize the coating properties of the composition. The pigment to binder weight ratio for Example II and the Control were the same, that is, 0.20:1.

The coating compositions of Example II and of the Control were applied separately to 4 inch by 12 inch zinc phosphate pretreated steel panels by conventional spray application methods. After a short flash time, a clear coat formulation (available commercially from PPG Industries, Inc. as DIAMOND COAT) was applied, by conventional spray application methods, directly over the previously applied basecoats. After a cure schedule of 136° C. for 30 minutes in an electric oven, the coatings were found to have the following physical properties:

TABLE II

| Example | D.O.I. | 20° Gloss | Chip Resistance |
| --- | --- | --- | --- |
| Control | 95–100 | 83 | 4 |
| Example II | 95–100 | 83 | 6 |

EXAMPLE III

This example describes the preparation of an industrial coatings composition made from the following mixture of ingredients:

| Ingredients | Parts by Weight (grams) |
| --- | --- |
| Pigment Dispersion of Example 1 | 1.0 |
| Polyester[1] | 10.7 |

[1]Film-forming polyester resin used in the preparation of an industrial coating composition available from PPG Industries, Inc. as POLYCRON 1000.

The coating formulation of Example III was compared to the POLYCRON 1000 formulation (Control) in which the pigment was incorporated into the formulation through a milling process. The pigment to binder weight ratio of Example III and the Control were about 0.20:1. The results of the comparison are reported in Table III below.

TABLE III

| Example | V.O.C. (pounds/gallon) | Minimum Sag (mils) | Tint Strength | Waring Blender Tint Strength | Hot Room Paint Color Shift (Delta E) |
| --- | --- | --- | --- | --- | --- |
| Control | 3.31 | 8.0 | 100% | 106% | 0.69 |
| Example III | 2.93 | 6.0 | 100% | 105% | 0.46 |

EXAMPLE IV

This example describes the preparation of an automotive refinish composition made from the following mixture of ingredients:

| Ingredients | Parts by Weight (grams) |
| --- | --- |
| Pigment Dispersion of Example 1 reduced to 28 percent solids with EKTASOLVE EEP | 129 |
| Acrylic polymer[1] | 131 |
| DAU-2[2] | 93.5 |

[1]Acrylic film-forming polymer used in the preparation of an automotive refinish formulation available from PPG Industries, Inc. as DELTRON.
[2]DAU-2 is an isocyanate crosslinker available from PPG Industries, Inc.

The coating composition of Example IV was compared to the DELTRON formulation (Control) in which the pigment was dispersed by the milling process. The coating composition of Example IV was back formulated with additional acrylic polymer such that it had the same pigment to binder weight ratio (0.41:1) as the Control. The coating composition of Example IV and of the Control were applied separately to 4 inch by 12 inch primed steel panels by conventional spray application methods. After a cure schedule of 66° C. for 30 minutes in an electric oven, the coatings were found to have the following physical properties:

TABLE IV

| Test (24 and 168 Hours After Coating Application) | Control | Example IV |
| --- | --- | --- |
| 24 Hour 20° Gloss | 83 | 84 |
| 168 Hour 20° Gloss | 80 | 82 |
| 24 Hour DOI | 45 | 55 |
| 168 Hour DOI After Humidity Testing | 45 | 55 |
| 24 Hour Sward Hardness | 20 | 18 |
| 168 Hour Sward Hardness | 24 | 18 |
| 24 Hour Pencil Hardness | 2B | 2B |
| 168 Hour Pencil Hardness | F | F |
| 24 Hour Gasoline Resistance | 3A | 3A |
| 168 Hour Gasoline Resistance | 5A | 4A |
| 24 Hour Toluene Resistance | 1 | 2 |
| 168 Hour Toluene Resistance | 2 | 2 |
| Tint Strength | 100% | 112% |
| Initial 20° Gloss | 76 | 77 |
| 20° Gloss After Humidity Testing | 70 | 73 |
| Initial Adhesion | 5 | 5 |
| Adhesion After Humidity Testing | 5 | 5 |

What is claimed is:

1. A pigment dispersion comprising finely divided pigment dispersed in a polymer containing one or more groups of the structure:

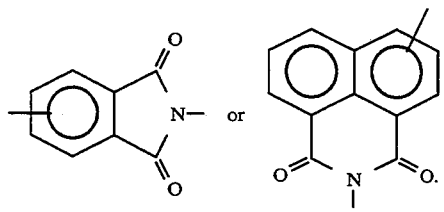

2. The pigment dispersion of claim 1 in which the groups are of the structure:

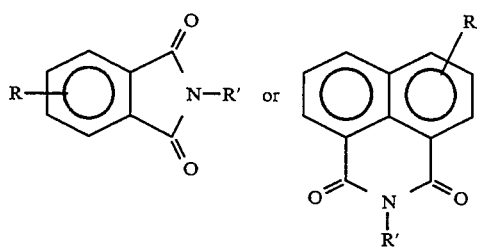

where R is H or P-X, where X is an organic linking radical and P is a polymer segment, and R' is H or a group containing an alkylene chain of 1 to 20 carbon atoms, or P-X as defined above.

3. The pigment dispersion of claim 2 in which R is P-X and R' is a group containing an alkylene chain of 1 to 20 carbon atoms.

4. The pigment dispersion of claim 2 in which R is P-X and R' is an imido substituted alkyl group containing from 1 to 18 carbon atoms in the alkyl group.

5. The pigment dispersion of claim 4 in which R' is represented by the following structural formula:

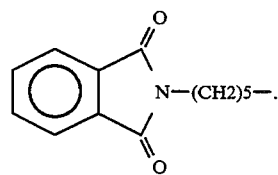

6. The pigment dispersion of claim 2 in which R is H and R' is P-X where X is represented by the following structural formula:

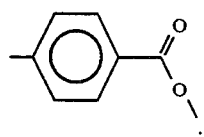

7. The pigment dispersion of claim 2 in which P is a polyester.

8. The pigment dispersion of claim 2 in which P is an acrylic polymer.

9. The pigment dispersion of claim 1 in which the pigment polymer weight ratio is from 0.2 to 3:1.

10. The pigment dispersion of claim 7 in which the pigment to polyester weight ratio is from 0.2 to 3:1.

11. A method for preparing a pigment dispersion comprising mixing together an aqueous pigment presscake with a dispersing vehicle under shearing conditions so as to displace water and intimately disperse the pigment in the dispersing vehicle characterized in that the dispersing vehicle is a polymer containing one or more groups of the structure:

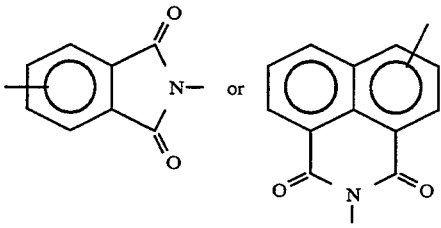

12. The method of claim 11 in which the polymer is a polyester.

13. The method of claim 11 in which the pigment to polymer weight ratio is from 0.2 to 3:1.

14. The method of claim 12 in which the pigment to polyester weight ratio is from 0.2 to 3:1.

* * * * *

UNITED STATES PATENT AND TRADEMARK OFFICE
CERTIFICATE OF CORRECTION

PATENT NO. : 5,336,314

DATED : August 9, 1994

INVENTOR(S) : Lamers

It is certified that error appears in the above-identified patent and that said Letters Patent is hereby corrected as shown below:

On the title page, correct the filing date, item [22] from "July 3, 1993" to --July 30, 1993--.

Col. 20, claim 9,

Line 2, after the word "pigment", insert the word --to--.

Signed and Sealed this

Eighth Day of November, 1994

Attest:

BRUCE LEHMAN

*Attesting Officer*     *Commissioner of Patents and Trademarks*